United States Patent
Hsu et al.

(10) Patent No.: US 10,879,716 B2
(45) Date of Patent: Dec. 29, 2020

(54) CHARGING METHOD, CHARGING SYSTEM AND ELECTRONIC DEVICE

(71) Applicant: MEDIATEK INC., Hsin-Chu (TW)

(72) Inventors: Chih-Yuan Hsu, Hsinchu (TW); Shih-Ming Chen, Hsinchu (TW); Chi-Ming Lee, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 137 days.

(21) Appl. No.: 15/983,226

(22) Filed: May 18, 2018

(65) Prior Publication Data

US 2019/0140456 A1 May 9, 2019

Related U.S. Application Data

(60) Provisional application No. 62/583,066, filed on Nov. 8, 2017.

(51) Int. Cl.
*H02J 7/00* (2006.01)
(52) U.S. Cl.
CPC ............ *H02J 7/007* (2013.01); *H02J 7/00* (2013.01); *H02J 7/00718* (2020.01)

(58) Field of Classification Search
CPC . H02J 7/0052; H02J 7/0083; H02J 2007/0062
USPC ...................... 320/134, 161, 162
See application file for complete search history.

(56) References Cited

U.S. PATENT DOCUMENTS

| | | | |
|---|---|---|---|
| 2007/0147098 A1* | 6/2007 | Mori ................ | H02J 3/01 363/71 |
| 2009/0184687 A1* | 7/2009 | Schroeder ........ | H01M 10/44 320/162 |
| 2017/0040817 A1* | 2/2017 | Hu .................. | H02J 7/045 |

* cited by examiner

*Primary Examiner* — Edward Tso
*Assistant Examiner* — Aaron Piggush
(74) *Attorney, Agent, or Firm* — McClure, Qualey & Rodack, LLP

(57) ABSTRACT

A charging method, a charging system and an electronic device are provided. The charging method includes the following steps: An inputting current limit is set. An inputting current of at least one charger is measured. A power source voltage of a power source is adjusted until a current difference between the inputting current and the inputting current limit is within a predetermined range.

20 Claims, 6 Drawing Sheets

US 10,879,716 B2

CHARGING METHOD, CHARGING SYSTEM AND ELECTRONIC DEVICE

This application claims the benefit of U.S. provisional application Ser. No. 62/583,066, filed Nov. 8, 2017, the subject matter of which is incorporated herein by reference.

TECHNICAL FIELD

The disclosure relates in general to a charging method, a charging system and an electronic device, and more particularly to a charging method, a charging system and an electronic device under a program power source.

BACKGROUND

Along the development of technology, various electronic devices have been invented. People may carry several electronic devices with its charging adaptors. In order to unify the charging standard, USB adaptor is widely used for those electronic devices.

Now, USB Implementers Forum (USB IF) releases the program power supply (PPS) of USB Power Delivery 3.0. In the PPS, the power source voltage and the power source current are continuously adjustable, so the USB adaptor can be widely used for more electronic devices. However, the charging efficiency is related to the power source voltage and the power source current. For optimizing charging efficiency, it is needed to invent a way to program the power source voltage or the power source current under the program power supply (PPS).

SUMMARY

The disclosure is directed to a charging method, a charging system and an electronic device. A power source voltage is swept to let an inputting current being approached an inputting current limit, such that the charging efficiency can optimized.

According to one embodiment, a charging method for optimizing charging efficiency is provided. The charging method includes the following steps: An inputting current limit is set. An inputting current of at least one charger is measured. A power source voltage of a power source is adjusted until a current difference between the inputting current and the inputting current limit is within a predetermined range.

According to another embodiment, an electronic device is provided. The electronic device includes at least one charger, a controller, a current detector and a communication unit. The charger is used for charging a battery. The controller is used for setting an inputting current limit. The current detector is used for measuring an inputting current of the charger. The communication unit is used for sending a programming command to a power source for adjusting a power source voltage of the power source until a current difference between the inputting current and the inputting current limit is within a predetermined range.

According to an alternative embodiment, a charging system for optimizing charging efficiency is provided. The charging system includes at least one charger, a controller, at least one current detector and a programmer. The charger is used for charging a battery. The controller is used for setting an inputting current limit. The current detector is used for measuring an inputting current of the charger. The programmer is used for adjusting a power source voltage of a power source until a current difference between the inputting current and the inputting current limit is within a predetermined range.

Figure 1:
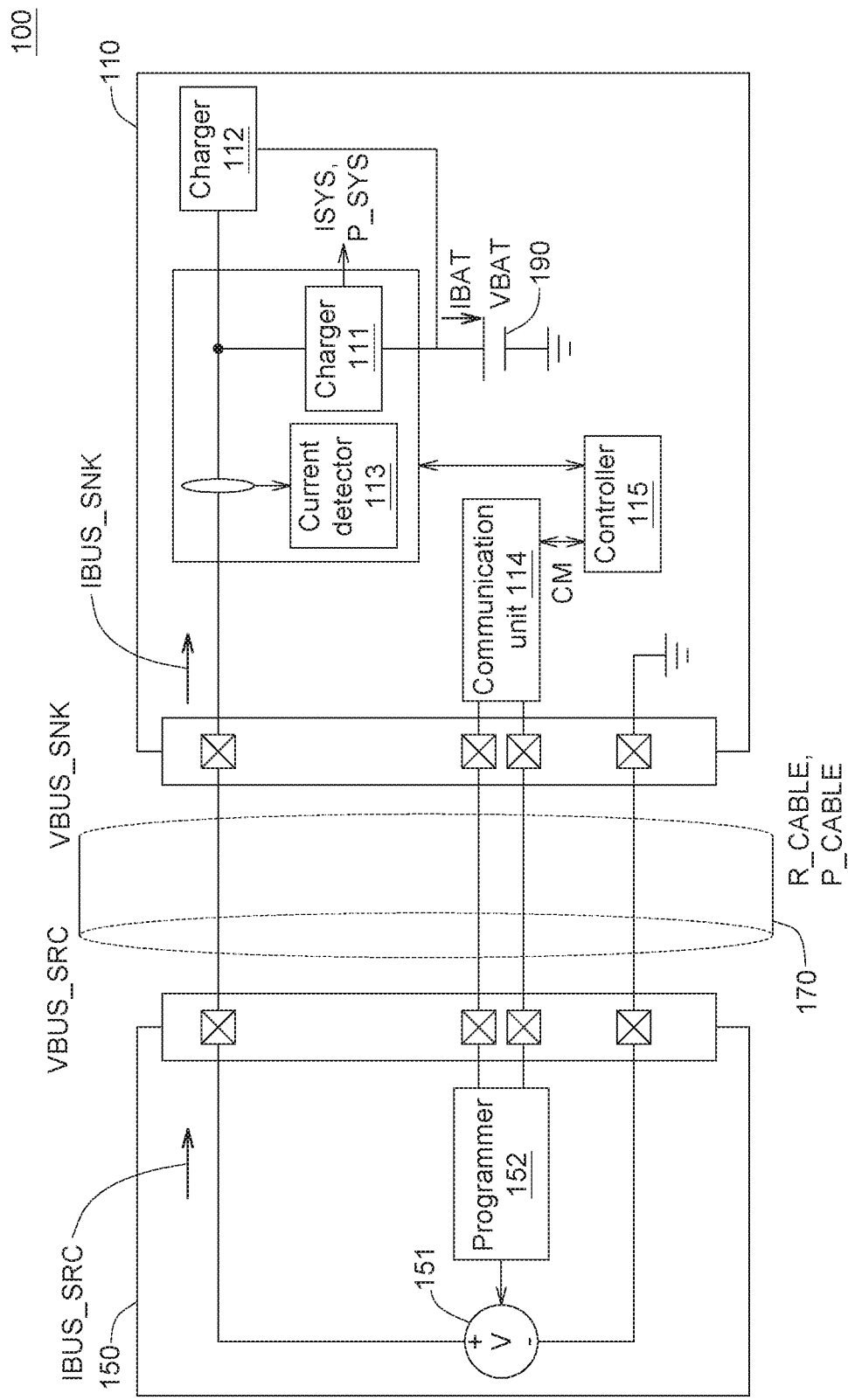
FIG. 1 shows a charging system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Refer to FIG. 1, which shows a charging system 100 according to one embodiment. The charging system 100 includes an electronic device 110, a charging adaptor 150 and a cable 170. The electronic device 110 may be a cell phone, a laptop or a mobile power. The charging adaptor 150 may be a type A USB adaptor, a type B USB adaptor, a type C USB adaptor or a micro USB adaptor. The cable may be a type A USB cable, a type B USB cable, a type C USB cable or a micro USB cable. The cable 170 is used to connect the electronic device 110 and the charging adaptor 150, such that the electronic device 110 can be charged.

In the embodiment, the electronic device 110 includes two chargers 111, 112, a current detector 113, a communication unit 114, a controller 115 and a battery 190. The charger 111 and 112 are used for charging the battery 190. The current detector 113 is used for measuring a current. The controller 115 is used for outputting a programming command CM to control the charging method. The communication unit 114 is used for sending the programming command CM to the power source 151. For example, the chargers 111, 112, the current detector, the communication unit 114 and the controller 115 may be a circuit, a chip, a firmware, a circuit board or a storage device storing a plurality of program codes.

The charging adaptor 150 includes a power source 151 and a programmer 152. The power source 151 may be a program power source (PPS). The programmer 152 is used for adjusting a power source voltage VBUS_SRC or a power source current IBUS_SRC of the power source 151. The programmer 152 may be a circuit, a chip, a firmware, a circuit board or a storage device storing a plurality of program codes.

Figure 2:
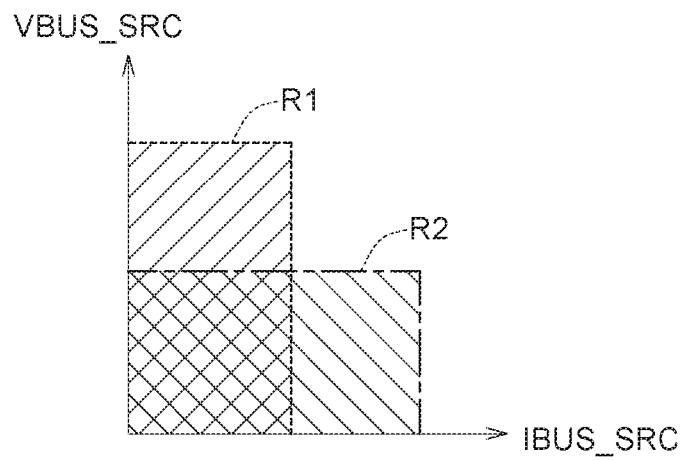
FIG. 2 shows programmable ranges of a power source.

Please refer to FIG. 2, which shows programmable ranges R1, R2 of the power source 151. The power source voltage VBUS_SRC and the power source current IBUS_SRC of the power source 151 can be programmable within the programmable range R1 or the programmable range R2. For example, the power source 151 may be programed at 5V/3 A or 9V/2.8 A. Several combinations of the power source voltage VBUS_SRC and the power source current IBUS_SRC can be selected.

Figure 3:
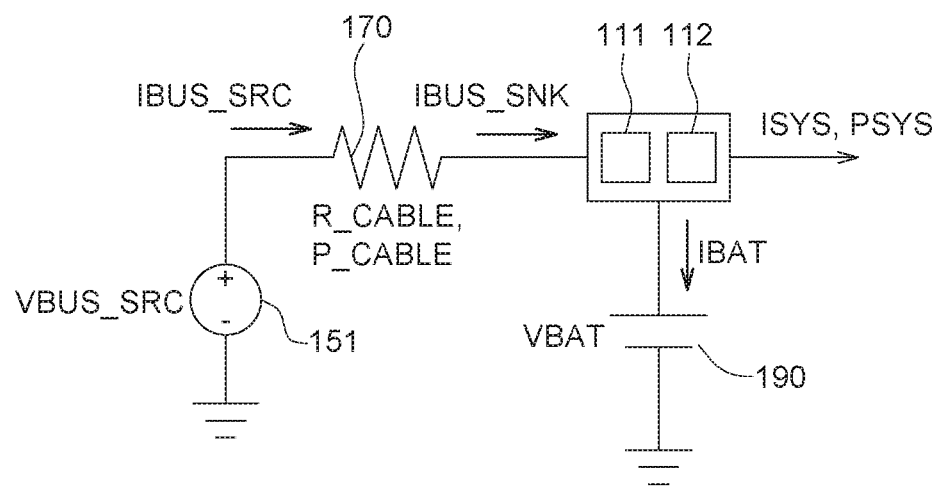
FIG. 3 shows a simplified circuit diagram of the charging system.

Please refer to FIG. 3, which shows a simplified circuit diagram of the charging system 100. The power source 151 has the power source voltage VBUS_SRC and the power source current IBUS_SRC. The cable 170 has a cable resistance R_CABLE. An inputting current IBUS_SNK is inputted into the chargers 111, 112, and a system current ISYS and a battery current IBAT are outputted. The battery 190 has a battery voltage. The relationship among the power source voltage VBUS_SRC, the power source current IBUS_SRC, the cable resistance R_CABLE, the battery voltage VBAT, the battery current IBAT, the system current ISYS and the efficiency η is illustrated as the following equation (1).

$$VBUS\_SRC * IBUS\_SRC - IBUS\_SRC^2 * R\_CABLE = VBAT*(IBAT + ISYS)/\eta \quad (1)$$

The equation (1) can be written via a system power dissipation P_SYS and a cable power dissipation P_CABLE, as the following equation (2)

$$VBUS\_SRC * IBUS\_SRC = \frac{VBAT}{\eta} * IBAT + P\_SYS + P\_CABLE \quad (2)$$

Figure 4:
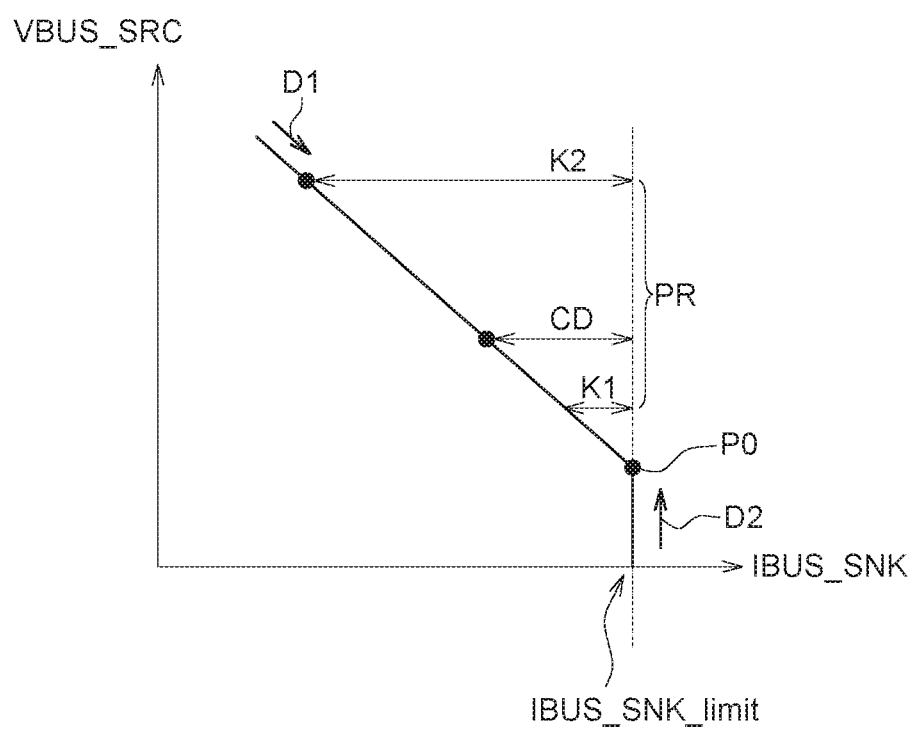
FIG. 4 illustrates a relationship between a powersource voltage and an inputting current.

Generally, the inputting current IBUS_SNK is similar to the power source current IBUS_SRC. Please referring to FIG. 4, a relationship between the power source voltage VBUS_SRC and the inputting current IBUS_SNK is illustrated. The inputting current IBUS_SNK is varied with the power source voltage VBUS_SRC until the inputting current IBUS_SNK reaches an inputting current limit IBUS_SNK_limit. If the inputting current IBUS_SNK approaches an inputting current limit IBUS_SNK_limit, the battery current IBAT, the system power dissipation P_SYS and the cable power dissipation P_CABLE will satisfy the expected values. In FIG. 4, point P0 is the optimal setting of the power source voltage VBUS_SRC. The point P0 can be found out along a direction D1 or a direction D2. In the direction D1, the power source voltage VBUS_SRC can be decreased to reduce a current difference CD between the inputting current IBUS_SNK and the inputting current limit IBUS_SNK_limit. In the direction D2, the power source voltage VBUS_SRC can be increased to let the current difference CD being larger than 0. That is to say, if the current difference CD is controlled to be within a predetermined range PR from a bottom bound K1 to a top bound K2, then the inputting current IBUS_SNK approaches the inputting current limit IBUS_SNK_limit and the charging efficiency is optimal. The bottom bound K1 is larger than 0 and lower than the top bound K2. The bottom bound K1 may be ranged from 0 mA to 2000 mA, such as 1 mA. The top bound K2 may be ranged from 0 mA to 2000 mA, such as 50 mA.

Figure 5:
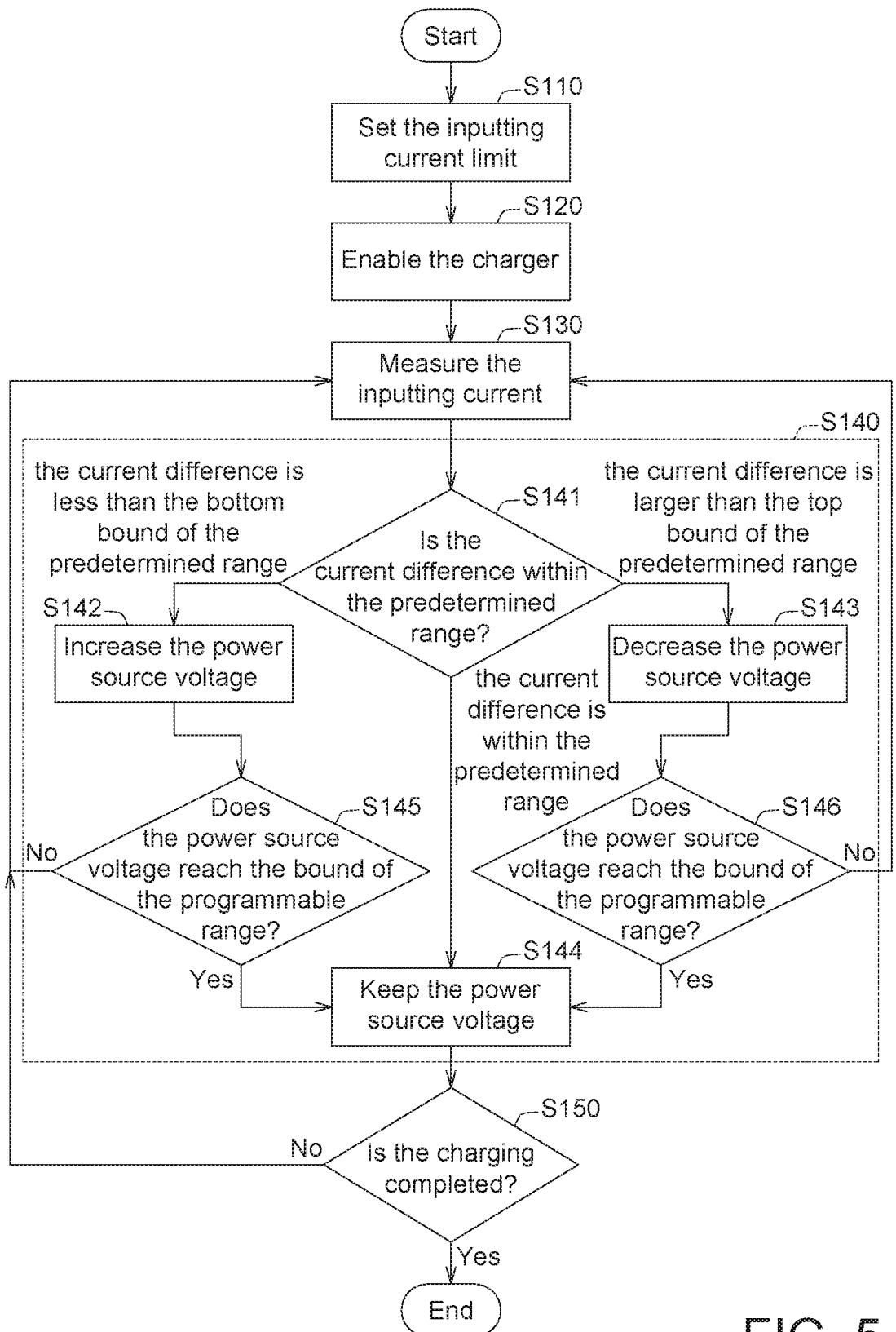
FIG. 5 illustrates a flowchart of a charging method of the charging system according to one embodiment.

Please referring to FIG. 5, a flowchart of a charging method of the charging system 100 according to one embodiment is illustrated. In step S110, the controller 115 sets the inputting current limit IBUS_SNK_limit.

In step S120, the controller 115 enables the charger 111 and/or the charger 112.

In step S130, the current detector 113 measures the inputting current IBUS_SNK.

In step S140, the controller 115 adjusts the power source voltage VBUS_SRC of the power source 151 until the current difference CD is within the predetermined range PR. The step S140 includes the steps S141 to S146.

In step S141, the controller 115 determines whether the current difference CD is within the predetermined range PR. If the current difference CD is less than the bottom bound K1 of the predetermined range PR, then the process proceeds to the step S142; if the current difference CD is larger than the top bound K2 of the predetermined range PR, then the process proceeds to the step S143; if the current difference CD is within the predetermined range PR, then the process proceeds to the step S144.

In step S142, the controller 115 increases the power source voltage VBUS_SRC. In step S143, the controller 115 decreases the power source voltage VBUS_SRC. In step S144, the controller 115 keeps the power source voltage VBUS_SRC.

In step S145, the controller 115 determines whether the power source voltage VBUS_SRC reaches the bound of the programmable range. If the power source voltage VBUS_SRC reaches the bound of the programmable range, then the process proceeds to the step S144; if the power source voltage VBUS_SRC does not reach the bound of the programmable range, then the process proceeds to the step S130.

In step S146, the controller 115 determines whether the power source voltage VBUS_SRC reaches the bound of the programmable range. If the power source voltage VBUS_SRC reaches the bound of the programmable range, then the process proceeds to the step S144; if the power source voltage VBUS_SRC does not reach the bound of the programmable range, then the process proceeds to the step S130.

When the current difference CD is within the predetermined range PR, the step S144 is performed and the process proceeds to the step S150. In step S150, the controller 115 determines whether the charging is completed. If the charging is terminated, then the process is terminated.

Figure 6:
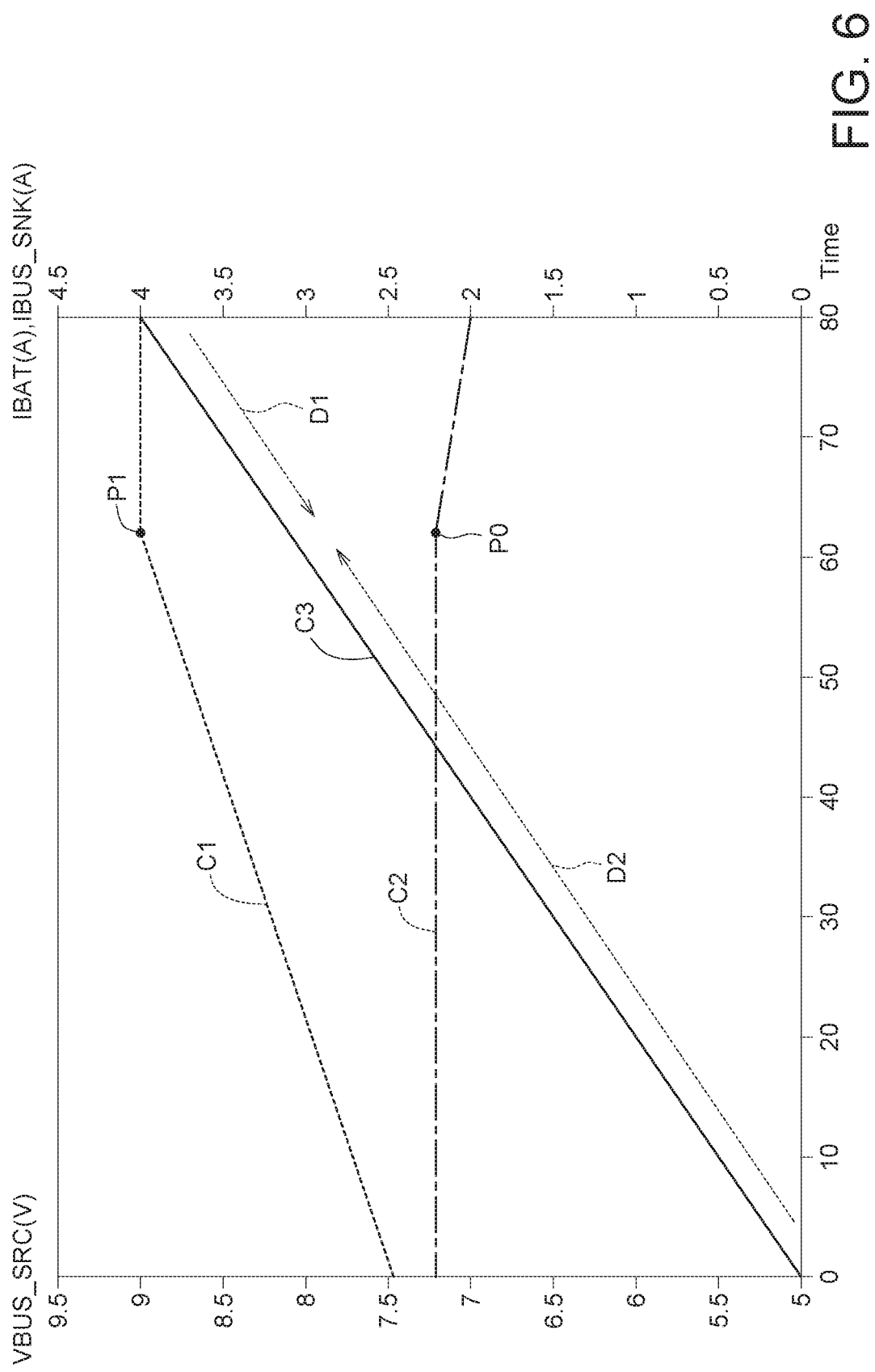
FIG. 6 shows a battery current curve, an inputting current curve and a power source voltage curve according to one example of performing the charging method.

Please refer to FIG. 6, which shows a battery current curve C1 an inputting current curve C2 and a power source voltage curve C3 according to one example of performing the charging method. In the step S142, the power source voltage VBUS_SRC is increased along the direction D2, such that the inputting current IBUS_SNK approaches the point P0 and the battery current IBAT approaches the point P1 to optimize the charging efficiency.

In the step S143, the power source voltage VBUS_SRC is decreased along the direction D1, such that the inputting current IBUS_SNK approaches the point P0 and the battery current IBAT approaches the point P1 to optimize the charging efficiency.

Figure 7:
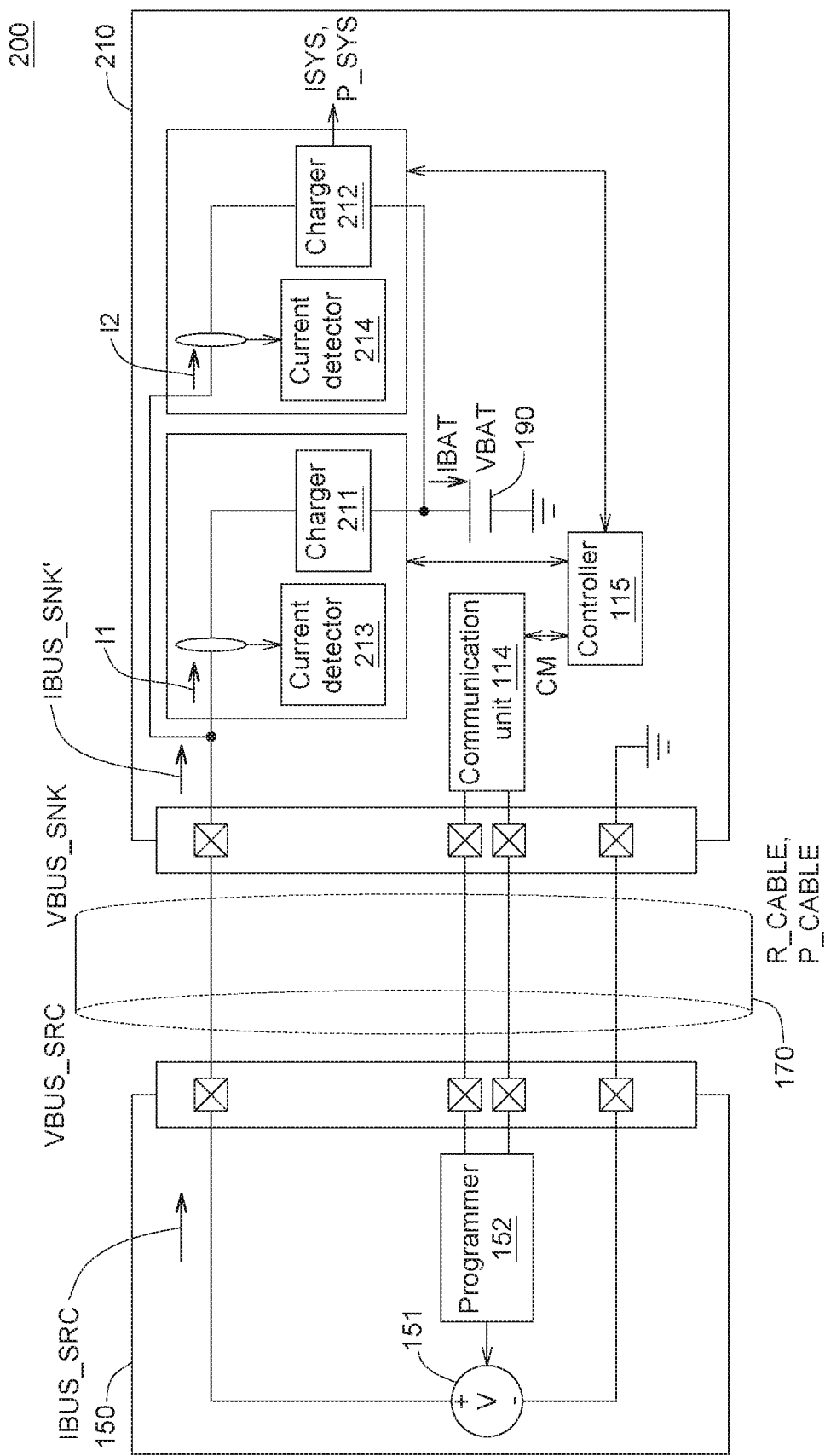
FIG. 7 shows another charging system according to another embodiment.

Please refer to FIG. 7, which shows another charging system 200 according to another embodiment. In this embodiment, the electronic device 210 includes two chargers 211, 212 and two current detectors 213, 214. The inputting current IBUS_SNK' includes two sub-currents I1, I2. The current detectors 213, 214 measure the sub-currents I1, I2 of the chargers 211, 212 respectively. The controller 115 sums up the two sub-currents I1, I2 to obtain the inputting current IBUS_SNK'.

Based on the embodiments described as above, the power source voltage VBUS_SRC is swept to let the inputting current IBUS_SNK being approached the inputting current limit IBUS_SNK_limit, such that the charging efficiency can optimized.

What is claimed is:

1. A charging method for optimizing charging efficiency, comprising:
   setting an inputting current limit;
   measuring an inputting current of at least one charger; and
   adjusting a power source voltage of a power source until a current difference between the inputting current and the inputting current limit is within a predetermined range having a bottom bound and a top bound, wherein the bottom bound and the top bound are unequal, the power source voltage is increased such that the current difference is raised to the bottom bound, and the power source voltage is decreased such that the current difference is declined to the top bound.

2. The charging method according to claim 1, wherein the step of adjusting the power source voltage includes:
   determining whether the current difference is within the predetermined range; and
   increasing the power source voltage, if the current difference is less than the bottom bound of the predetermined range.

3. The charging method according to claim 2, wherein the bottom bound is larger than 0 and lower than the top bound.

4. The charging method according to claim 1, wherein the step of adjusting the power source voltage includes:
   determining whether the current difference is within the predetermined range having a bottom bound and a top bound; and
   decreasing the power source voltage, if the current difference is larger than the top bound of the predetermined range.

5. The charging method according to claim 4, wherein the top bound is larger than the bottom bound.

6. The charging method according to claim 1, wherein the inputting current is measured at an input end of the charger.

7. The charging method according to claim 1, wherein a quantity of the at least one charger is two, and the inputting current is a sum of two sub-currents inputted to the two chargers.

8. The charging method according to claim 1, wherein the power source is a programmable power source.

9. An electronic device, comprising:
   at least one charger which charges a battery;
   a controller which sets an inputting current limit;
   a current detector which measures an inputting current of the charger; and
   a communication unit which sends a programming command to a power source which adjusts a power source voltage of the power source until a current difference between the inputting current and the inputting current limit is within a predetermined range having a bottom bound and a top bound, wherein the bottom bound and the top bound are unequal, the power source voltage is increased such that the current difference is raised to the bottom bound, and the power source voltage is decreased such that the current difference is declined to the top bound.

10. The electronic device according to claim 9, wherein the programming command is used for determining whether the current difference is within the predetermined range, and increasing the power source voltage, if the current difference is less than the bottom bound of the predetermined range.

11. The electronic device according to claim 10, wherein the bottom bound is larger than 0 and lower than the top bound.

12. The electronic device according to claim 9, wherein the programming command is used for determining whether the current difference is within the predetermined range having a bottom bound and a top bound, and decreasing the power source voltage, if the current difference is larger than the top bound of the predetermined range.

13. The electronic device according to claim 12, wherein the top bound is larger than the bottom bound.

14. The electronic device according to claim 9, wherein the current detector measures the inputting current at an input end of the charger.

15. The electronic device according to claim 9, wherein a quantity of the at least one charger is two, a quantity of the at least one current detector is two, the inputting current includes two sub-currents, and the current detectors measure the two sub-currents of the two chargers respectively.

16. The electronic device according to claim 9, wherein the power source is a programmable power source.

17. A charging system for optimizing charging efficiency, comprising:
   at least one charger which charges a battery;
   a controller which sets an inputting current limit;
   at least one current detector which measures an inputting current of the charger; and
   a programmer which adjusts a power source voltage of a power source until a current difference between the inputting current and the inputting current limit is within a predetermined range having a bottom bound and a top bound, wherein the bottom bound and the top bound are unequal, the power source voltage is increased such that the current difference is raised to the bottom bound, and the power source voltage is decreased such that the current difference is declined to the top bound.

18. The charging system according to claim 17, wherein the programmer determines whether the current difference is within the predetermined range, and increases the power source voltage, if the current difference is less than the bottom bound of the predetermined range.

19. The charging system according to claim 17, wherein the programmer determines whether the current difference is within the predetermined range having a bottom bound and a top bound, and decreases the power source voltage, if the current difference is larger than the top bound of the predetermined range.

20. The charging system according to claim 17, wherein a quantity of the at least one charger is two, a quantity of the at least one current detector is two, the inputting current includes two sub-currents, and the current detectors measure the two sub-currents of the two chargers respectively.

* * * * *